United States Patent
Lee et al.

(10) Patent No.: US 12,368,002 B2
(45) Date of Patent: Jul. 22, 2025

(54) MULTILAYER CERAMIC CAPACITOR

(71) Applicant: SAMSUNG ELECTRO-MECHANICS CO., LTD., Suwon-si (KR)

(72) Inventors: Taek Jung Lee, Suwon-si (KR); Beom Seock Oh, Suwon-si (KR); Ho Jun Lee, Suwon-si (KR); Kyung Mi Bae, Suwon-si (KR); Jin O Yoo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 74 days.

(21) Appl. No.: 17/973,038

(22) Filed: Oct. 25, 2022

(65) Prior Publication Data

US 2023/0154678 A1 May 18, 2023

(30) Foreign Application Priority Data

Nov. 16, 2021 (KR) .......................... 10-2021-0157689

(51) Int. Cl.
*H01G 4/012* (2006.01)
*H01G 4/008* (2006.01)
(Continued)

(52) U.S. Cl.
CPC ............. *H01G 4/012* (2013.01); *H01G 4/008* (2013.01); *H01G 4/1227* (2013.01); *H01G 4/30* (2013.01)

(58) Field of Classification Search
CPC ...... H01G 4/008; H01G 4/012; H01G 4/1227; H01G 4/30
See application file for complete search history.

(56) References Cited

U.S. PATENT DOCUMENTS

2012/0188682 A1 7/2012 Sato et al.
2014/0345927 A1* 11/2014 Itagaki .................. H01G 4/232
174/260
(Continued)

FOREIGN PATENT DOCUMENTS

JP H065459 A * 6/1992
JP 2616785 B2 6/1997
(Continued)

OTHER PUBLICATIONS

Translation JP H06-5459, 1992.*
(Continued)

*Primary Examiner* — Nathan Milakovich
(74) *Attorney, Agent, or Firm* — Morgan, Lewis & Bockius LLP

(57) ABSTRACT

A multilayer ceramic capacitor includes: a body including a dielectric layer and first and second internal electrodes alternately disposed with the dielectric layer interposed therebetween; and a first external electrode and a second external electrode disposed externally on the body, the first external electrode being connected to the first internal electrode and the second external electrode being connected to the second internal electrode, wherein the first and second external electrodes are disposed on the body, and includes a first electrode layer including Ni and Cr, a second electrode layer disposed on the first electrode layer, and including Cu, and a plating layer disposed on the second electrode layer.

20 Claims, 9 Drawing Sheets

(51) Int. Cl.
    *H01G 4/12*     (2006.01)
    *H01G 4/30*     (2006.01)

(56) References Cited

U.S. PATENT DOCUMENTS

| | | | |
|---|---|---|---|
| 2019/0287720 A1 | 9/2019 | Mori et al. | |
| 2020/0143990 A1* | 5/2020 | Kim | H01G 4/232 |
| 2020/0388439 A1 | 12/2020 | Togawa | |
| 2022/0301777 A1* | 9/2022 | Nishimura | H01G 4/232 |

FOREIGN PATENT DOCUMENTS

| | | |
|---|---|---|
| JP | 2012-164966 A | 8/2012 |
| JP | 2019-165083 A | 9/2019 |
| JP | 2020-202220 A | 12/2020 |
| KR | 10-0206385 B1 | 7/1999 |

OTHER PUBLICATIONS

Office Action issued on Mar. 31, 2025 in the corresponding Korean Patent Application No. 10-2021-0157689 with English translation.

* cited by examiner

MULTILAYER CERAMIC CAPACITOR

CROSS-REFERENCE TO RELATED APPLICATION(S)

This application claims benefit of priority to Korean Patent Application No. 10-2021-0157689 filed on Nov. 16, 2021 in the Korean Intellectual Property Office, the disclosure of which is incorporated herein by reference in its entirety.

TECHNICAL FIELD

The present disclosure relates to a multilayer ceramic capacitor.

BACKGROUND

In general, an electronic component using a ceramic material such as a capacitor, an inductor, a piezoelectric element, a varistor or a thermistor includes a ceramic body made of a ceramic material, an internal electrode formed inside the body, and an external electrode installed on a surface of the ceramic body to be connected to the internal electrode.

Among ceramic electronic components, multilayer ceramic capacitors are widely used as components of mobile communication devices such as computers, PDAs, and mobile phones due to their small size, high capacitance, and ease of mounting.

In recent years, as electronic products have been miniaturized and multifunctionalized, chip components have also tend to be miniaturized and highly functional. Therefore, a multilayer ceramic capacitor having a small size and a large capacitance is required.

Accordingly, research to reduce a thickness of the multilayer ceramic capacitor is continued, and to this end, efforts to reduce the thickness of the external electrode of the multilayer ceramic capacitor are continuing.

In particular, in the case of an ultra-thin multilayer ceramic capacitor having a thickness of 70 µm or less, there is a need to reduce the thickness of the external electrode in order to maximize capacitance by increasing a volume occupied by the ceramic body relative to a volume of the entire multilayer ceramic capacitor.

However, there is a limitation in reducing a thickness of the external electrode formed by the conventional dipping process, and various problems may occur as the external electrode is thinned to reduce the thickness thereof.

SUMMARY

An aspect of the present disclosure is to provide a multilayer ceramic capacitor having high capacitance by thinning an external electrode of a multilayer ceramic capacitor having a reduced thickness.

Another aspect of the present disclosure is to provide a multilayer ceramic capacitor having improved conductivity of an external electrode and improved adhesion to a body.

According to an aspect of the present disclosure, a multilayer ceramic capacitor includes: a body including a dielectric layer and a first internal electrode and a second internal electrode disposed with the dielectric layer interposed therebetween; and a first external electrode and a second external electrode, disposed externally on the body, the first external electrode being connected to the first internal electrode and the second external electrode being connected to the second internal electrode, wherein the first and second external electrodes include a first electrode layer disposed on the body, and including Ni and Cr, a second electrode layer disposed on the first electrode layer, and including Cu, and a plating layer disposed on the second electrode layer.

According to an aspect of the present disclosure, a multilayer ceramic capacitor includes: a body including a dielectric layer and first and second internal electrodes alternately disposed with the dielectric layer interposed therebetween; and a first external electrode and a second external electrode disposed externally on the body, the first external electrode being connected to the first internal electrode and the second external electrode being connected to the second internal electrode, wherein the first and second external electrodes are disposed only on one of first and second surfaces of the body facing each other with respect to a stacking direction of the first and second internal electrodes, and wherein the first and second external electrodes include a first electrode layer disposed on the body, the first electrode layer including Ni and Cr, and a content of Cr in the first electrode layer is 30 to 50 wt %, a second electrode layer disposed on the first electrode layer, and including Cu, and a plating layer disposed on the second electrode layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
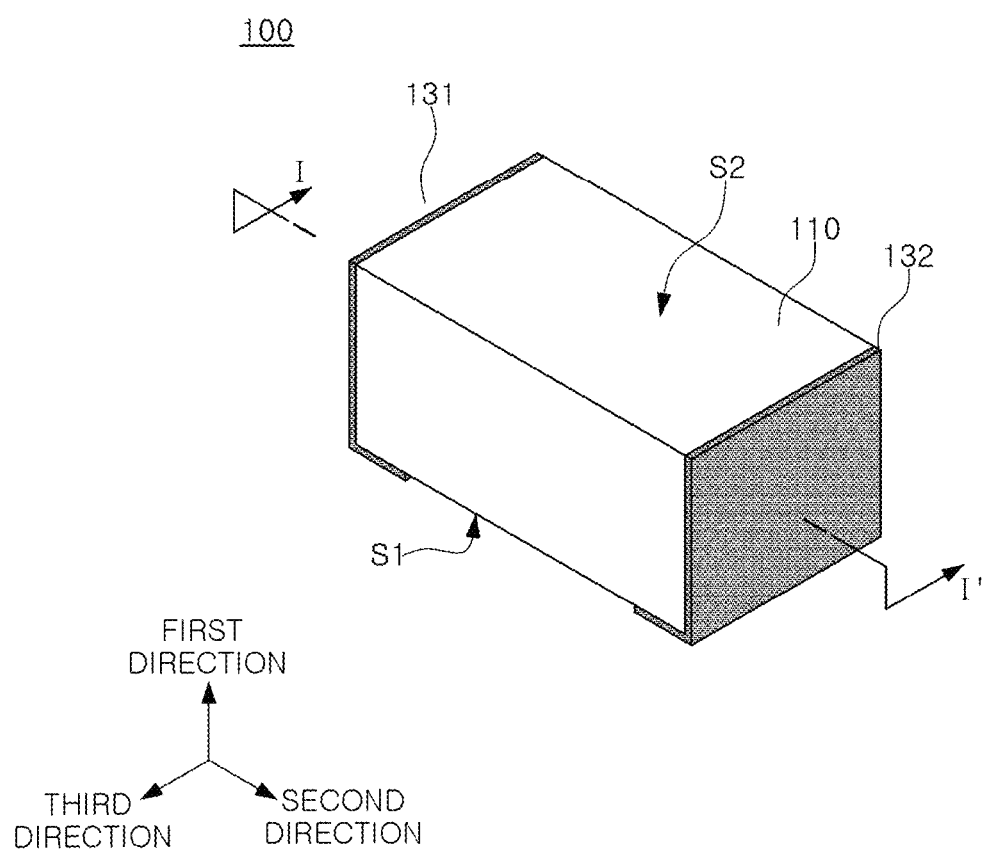
FIG. 1 is a perspective view schematically illustrating a multilayer ceramic capacitor according to an embodiment of the present disclosure.

Hereinafter, embodiments of the present disclosure will be described as follows with reference to the attached drawings. It is not intended to limit the techniques described herein to specific embodiments, and it should be understood to include various modifications, equivalents, and/or alternatives to the embodiments of the present disclosure. In connection with the description of the drawings, similar reference numerals may be used for similar components.

In the drawings, for clarity of description, parts irrelevant to the description may be omitted, and thicknesses of elements may be magnified to clearly represent layers and regions. Components having the same functions within a scope of the same idea may be described using the same reference numerals. In the present specification, expressions such as "having", "may have", "include" or "may include" may indicate a presence of corresponding features (e.g., components such as numerical values, functions, operations, components, or the like), and may not exclude a presence of additional features.

In the drawings, a first direction may be defined as a stacking direction or a thickness (T) direction, a second direction may be defined as a length (L) direction, and a third direction may be defined as a width (W) direction.

Figure 2:
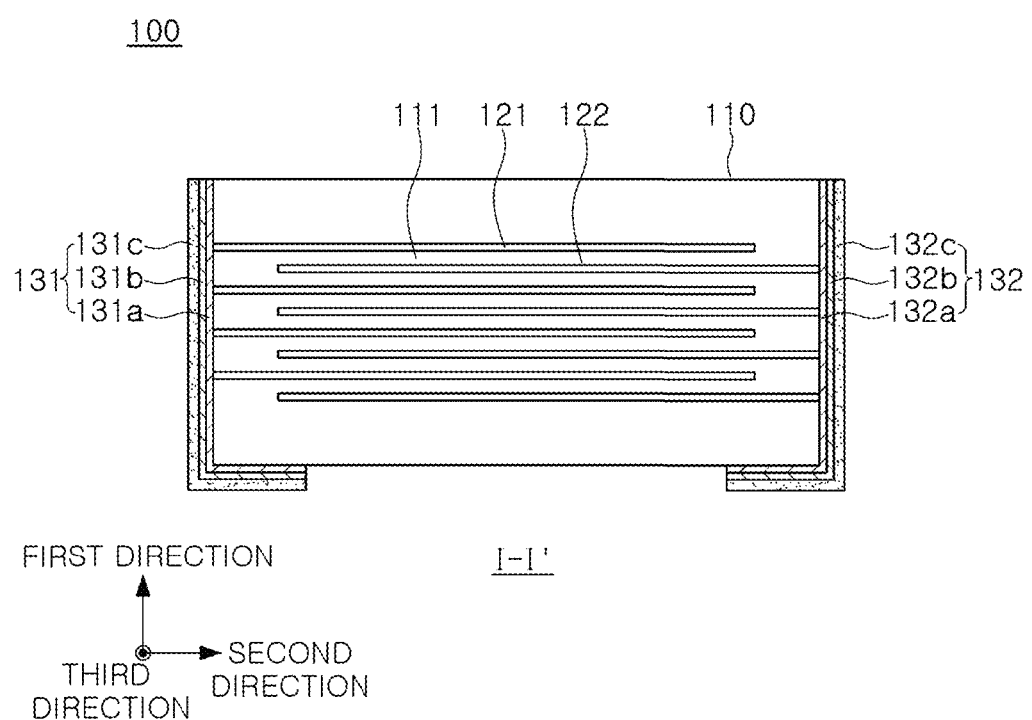
FIG. 2 is a cross-sectional view taken along line I-I' of FIG. 1.

FIG. 1 is a perspective view schematically illustrating an external appearance of a multilayer ceramic capacitor according to an embodiment of the present disclosure, and FIG. 2 is a cross-sectional view taken along line I-I' of FIG. 1.

According to an embodiment of the present disclosure, a multilayer ceramic capacitor 100 is provided. The multilayer ceramic capacitor 100 includes: a body 110 including a dielectric layer 111 and a first internal electrode 121 and a second internal electrode 122 alternately disposed with the dielectric layer interposed therebetween, a first external electrode 131 and a second external electrode 132, disposed externally on the body, the first external electrode 131 being connected to the first internal electrode and the second external electrode 132 being connected to the second internal electrode, wherein the first and second external electrodes include first electrode layers 131a and 132a disposed on the body, and including Ni and Cr, second electrode layers 131b and 132b disposed on the first electrode layer, and including Cu, and plating layers 131c and 132c disposed on the second electrode layer.

First, referring to FIGS. 1 to 2, a multilayer ceramic capacitor 100 includes a body 110 including a dielectric layer 111 and a first internal electrode 121 and a second internal electrode 122 alternately disposed therebetween, and a first external electrode connected to the first internal electrode 121 and a second external electrode 132 connected to the second internal electrode 122, disposed externally on the body 110.

The body 110 has a form in which a plurality of dielectric layers 111 are stacked, and may be obtained by stacking a plurality of green sheets and then sintering the same. By the sintering process, the plurality of dielectric layers 111 may have an integrated shape. The body 110 is not particularly limited in terms of shape, but may have a substantially hexahedral shape.

That is, the body 110 may not have a perfect hexahedral shape, but may have a substantially hexahedral shape due to a difference in thickness according to the disposition of the internal electrodes and polishing of corner portions.

A dielectric layer 111 included in the body 110 may include a ceramic material having a high dielectric constant, for example, a barium titanate ($BaTiO_3$)-based or strontium titanate ($SrTiO_3$)-based material, but other materials known in the art may be used as long as sufficient capacitance may be obtained.

The dielectric layer 111 may further include additives, organic solvents, plasticizers, binders and dispersants, if necessary, along with such a ceramic material as a main component, and may include of which the same material as that added to the internal electrodes 121 and 122 as an additive thereamong, and a concentration of these additives is appropriately adjusted locally to ensure uniform sintering properties.

The body 110 includes a first internal electrode 121 and a second internal electrode 122 alternately disposed to face each other with the dielectric layer 111 interposed therebetween. In addition, the first internal electrode 121 may be disposed to a side surface of the body 110, and the second internal electrode 122 may be exposed to the other surface opposite to the side surface of the body 110.

Accordingly, the a first internal electrode 121 and a second internal electrode 122 may be electrically connected to the first second external electrode 131 and the second external electrode 132, respectively, and thus may have different polarities during operation.

The a first internal electrode 121 and a second internal electrode 122 may be obtained by printing a paste including a conductive metal to a predetermined thickness on one surface of the ceramic green sheet and then sintering the paste.

Examples of a conductive metal constituting the first internal electrode 121 and the second internal electrode 122 may include Ni, Cu, Pd, Ag, Pt, and alloys thereof, but the present disclosure is not limited thereto.

Hereinafter, the structures of the first second external electrode 131 and the second external electrode 132 will be described in detail with reference to FIG. 2.

Referring to FIG. 2, the first and second external electrodes 131 and 132 may be disposed externally on the body 110 to respectively be connected to the first internal electrode 121 and the second internal electrode 122, and may include first electrode layer 131a and 132a disposed on the body 110, and including Ni and Cr, second electrode layers 131b and 132b disposed on the first electrode layers, and including Cu, and plating layers 131c and 132c disposed on the second electrode layers.

The first electrode layers 131a and 132a may include nickel (Ni) and chromium (Cr). In the case of a Ni—Cr alloy, as a content of Cr increases, a thermal expansion coefficient (CTE) tends to decrease, and accordingly, CTE matching of a thermal expansion coefficient of the Ni—Cr alloy and a thermal expansion coefficient of the ceramic material included in the body 110 may be improved.

That is, the thermal expansion coefficient of the Ni—Cr alloy included in the first electrode layers 131a and 132a may have a value close to that of the ceramic material included in the body 110 compared to a single Ni metal.

When the thermal expansion coefficient between the metal included in the external electrode and the ceramic material included in the body is not matched, the adhesion therebetween may be reduced due to a difference in thermal strain acting on the external electrode and the body.

On the other hand, when the multilayer ceramic capacitor 100 according to an embodiment of the present disclosure, the thermal expansion coefficient of the Ni—Cr alloy included in the first electrode layers 131a and 132a may have a value, close to that of the ceramic material included in the body 110. That is, matching therebetween may be improved.

Accordingly, the adhesion between the first electrode layers 131a and 132a and the body 110 may be improved, and accordingly, even if the external electrodes 131 and 132 are thinly formed, adhesion with the body 110 may be maintained.

In particular, in the case of the multilayer ceramic capacitor 100 having a thickness of 70 μm or less, in order to maximize the capacitance by increasing a volume of the body 110 compared to a volume of the multilayer ceramic capacitor 100, the external electrodes 131 and 132 should be thinly formed to be thin. Accordingly, the adhesion between the body 110 and the external electrodes 131 and 132 may be reduced.

On the other hand, according to an embodiment of the present disclosure, even when the external electrodes 131 and 132 are thinned in order to maximize the capacitance in the multilayer ceramic capacitor 100 having a thickness of 70 μm or less, the adhesion between the body 110 and the external electrodes 131 and 132 may be maintained.

In addition, in the case of the Ni—Cr alloy, it is possible to prevent oxidation of the first electrode layers 131a and 132a by preventing diffusion of oxygen as well as Cr suppresses diffusion of Ni. That is, it is excellent in terms of corrosion resistance and oxidation resistance.

The second electrode layers 131b and 132b may be disposed on the first electrode layers 131a and 132a, and include Cu. When the second electrode layers 131b and 132b include Cu, conductivity of the external electrodes 131 and 132 may be improved through high electrical conductivity of Cu.

In addition, heat generated inside the multilayer ceramic capacitor 100 may be effectively dissipated through high thermal conductivity of Cu, thereby ensuring thermal stability.

Accordingly, in the multilayer ceramic capacitor 100 having a thickness of 70 μm or less, electrical conductivity of the external electrodes 131 and 132 may be maintained even when the external electrodes 131 and 132 are thinned in order to maximize capacitance.

Plating layers 131c and 132c may be disposed on the second electrode layers 131b and 132b. The plating layers 131c and 132c may serve to improve mounting characteristics. The type of the plating layers 131c and 132c is not particularly limited, and for example, the plating layers 131c and 132c may be plating layers including at least one of Ni, Sn, Pd, Cu, and alloys thereof.

According to an embodiment of the present disclosure, a Cr content in the first electrode layers 131a and 132a may be 30 to 50 wt % based on, for example, a total weight of Ni and Cr in the first electrode layer. When the Cr content is less than 30 wt %, matching between the thermal expansion coefficient of the Ni—Cr alloy included in the first electrode layers 131a and 132a and the thermal expansion coefficient of the ceramic material included in the body 110 may be reduced. When the Cr content exceeds 50 wt %, toughness and workability may be excessively deteriorated.

When the Cr content in the first electrode layers 131a and 132a satisfies the above range, the external electrodes 131 and 132 may be thinned to maximize capacitance in the multilayer ceramic capacitor 100 having a thickness of 70 μm or less. The Cr content may be determined by methods known to those of ordinary skill in the art and include scanning electron microscopy coupled with energy-dispersive X-ray spectroscopy (SEM-EDS) and X-ray diffraction spectroscopy (XRD).

According to an embodiment of the present disclosure, first electrode layers 131a and 132a and second electrode layers 131b and 132b may be sputtering layers. That is, the first and second electrode layers may be sputtering layers formed by a sputtering method.

The first electrode layers 131a and 132a and the second electrode layers 131b and 132b are sputtering layers formed by a sputtering method, so the electrode layers may be formed more precisely than in a conventional dipping method using a conductive paste. In addition, density thereof is higher than that of the external electrodes 131 and 132 formed by the conventional dipping method, moisture resistance reliability may be improved.

In addition, since the first electrode layers 131a and 132a and the second electrode layers 131b and 132b can be formed to be thin, thicknesses of the first external electrode 131 and the second external electrode 132 may be reduced to increase a volume of the 110 contributing to capacitance relative to a total volume of the multilayer ceramic capacitor 100, such that the capacitance of the multilayer ceramic capacitor 100 may be maximized.

In particular, even when the external electrodes 131 and 132 are thinned in order to maximize the capacitance of the multilayer ceramic capacitor 100 having a thickness of 70 μm or less, the external electrodes may be precisely formed, and the external electrodes 131 and 132 having excellent density and moisture resistance reliability may be formed.

According to an embodiment of the present disclosure, a thickness of the first electrode layers 131a and 132a may be 10 to 100 nm.

When the thickness of the first electrode layers 131a and 132a is less than 10 nm, adhesion and moisture resistance reliability between the first electrode layers 131a and 132a and the body 110 may be deteriorated.

When the thickness of the first electrode layers 131a and 132a exceeds 100 nm, the thickness of the external electrodes 131 and 132 may increase, so that the volume of the 110 contributing the capacitance compared to the total volume of the multilayer ceramic capacitor 100 may decrease, and accordingly, the capacitance of the multilayer ceramic capacitor 100 may decrease.

Meanwhile, the thickness of the first electrode layer may mean a maximum value among values measured in a plurality of regions, or alternatively, may be a value obtained by averaging a plurality of values.

According to an embodiment of the present disclosure, the thickness of the second electrode layers 131b and 132b may be 10 to 300 nm.

When the thickness of the second electrode layers 131b and 132b is less than 10 nm, conductivity and thermal stability of the external electrodes 131 and 132 may be deteriorated.

When the thickness of the second electrode layers 131b and 132b exceeds 300 nm, the thickness of the external electrodes 131 and 132 may increase, so that the volume of the body 110 contributing to capacitance compared to the total volume of the capacitor 100 may decrease, and accordingly, the capacitance of the multilayer ceramic capacitor 100 may decrease.

Meanwhile, the thickness of the second electrode layer may mean a maximum value among values measured in a plurality of regions, or alternatively, may be a value obtained by averaging a plurality of values.

Figure 3:
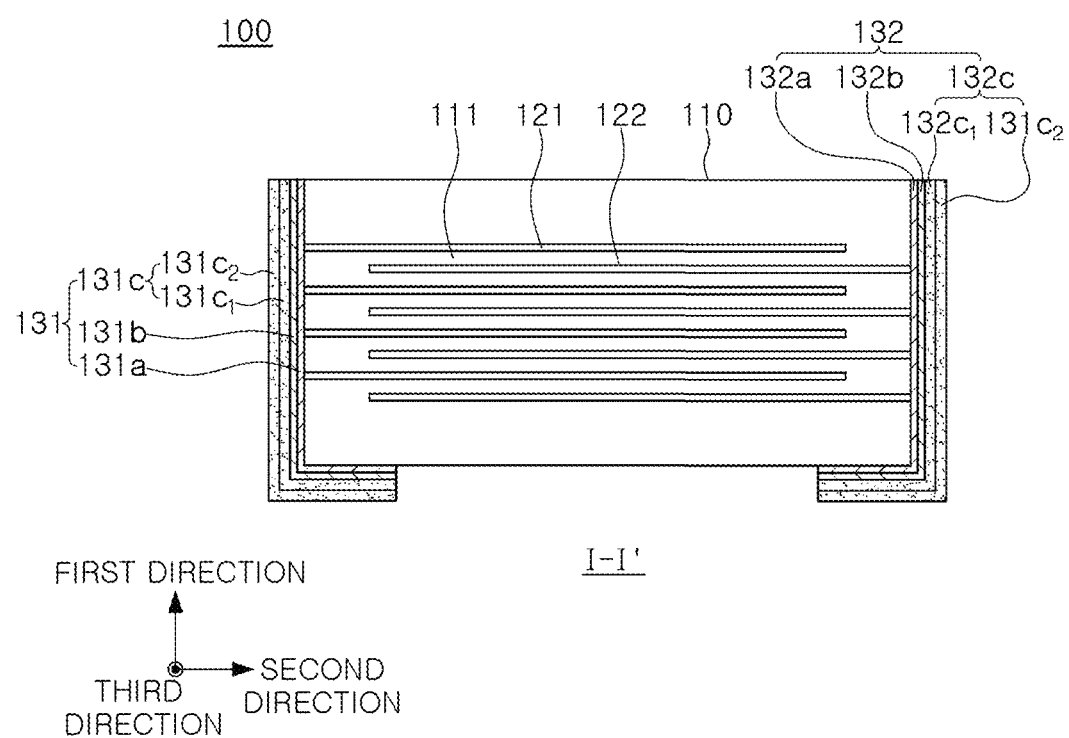
FIG. 3 is a cross-sectional view of a multilayer ceramic capacitor according to an embodiment of the present disclosure.

FIG. 3 is a cross-sectional view of a multilayer ceramic capacitor 100 according to an embodiment of the present disclosure.

Referring to FIG. 3, plating layers 131c and 132c may include first plating layers 131c1 and 132c1 disposed on the second electrode layer, including nickel (Ni), and second plating layers 131c2 and 132c2 disposed on the first plating layer, and including tin (Sn).

The first plating layers 131c1 and 132c1 may include Ni, and accordingly, when the multilayer ceramic capacitor 100 is mounted on a substrate, or the like, migration of metal used as a solder into the external electrodes 131 and 132 may be prevented.

The second plating layers 131c2 and 132c2 may include Sn, and accordingly, mounting characteristics of the multilayer ceramic capacitor 100 may be improved.

According to an embodiment of the present disclosure, a thickness of the first plating layers 131c1 and 132c1 and the second plating layers 131c2 and 132c2 may be 1 to 5 μm.

The thickness may be 1 μm or more in order to prevent migration of metal used as a solder and to improve mounting characteristics of the multilayer ceramic capacitor 100, and the thickness may be 5 μm or less to maximize the capacitance of the multilayer ceramic capacitor 100 by reducing the thickness of the external electrodes 131 and 132. Meanwhile, the thickness of the first and second plating layers may mean a maximum value among values measured in a plurality of regions, or alternatively, may be an average value of a plurality of values.

The thickness of the multilayer ceramic capacitor 100 according to an embodiment of the present disclosure may be 70 μm or less. In this case, the thickness of the multilayer ceramic capacitor 100 may mean a length measured in a first direction or in a stacking direction of internal electrodes.

As described above, since the first electrode layers 131a and 132a and the second electrode layers 131b and 132b have excellent adhesion to the body 110, and excellent electrical conductivity, external electrodes may be easily thinned.

Accordingly, the volume of the body 110 contributing to the capacitance relative to a total volume of the multilayer ceramic capacitor 100 having a thickness of 70 μm or less may be increased, and the multilayer ceramic capacitor 100 having an ultra-thin film and high capacitance may be realized.

Figure 4:
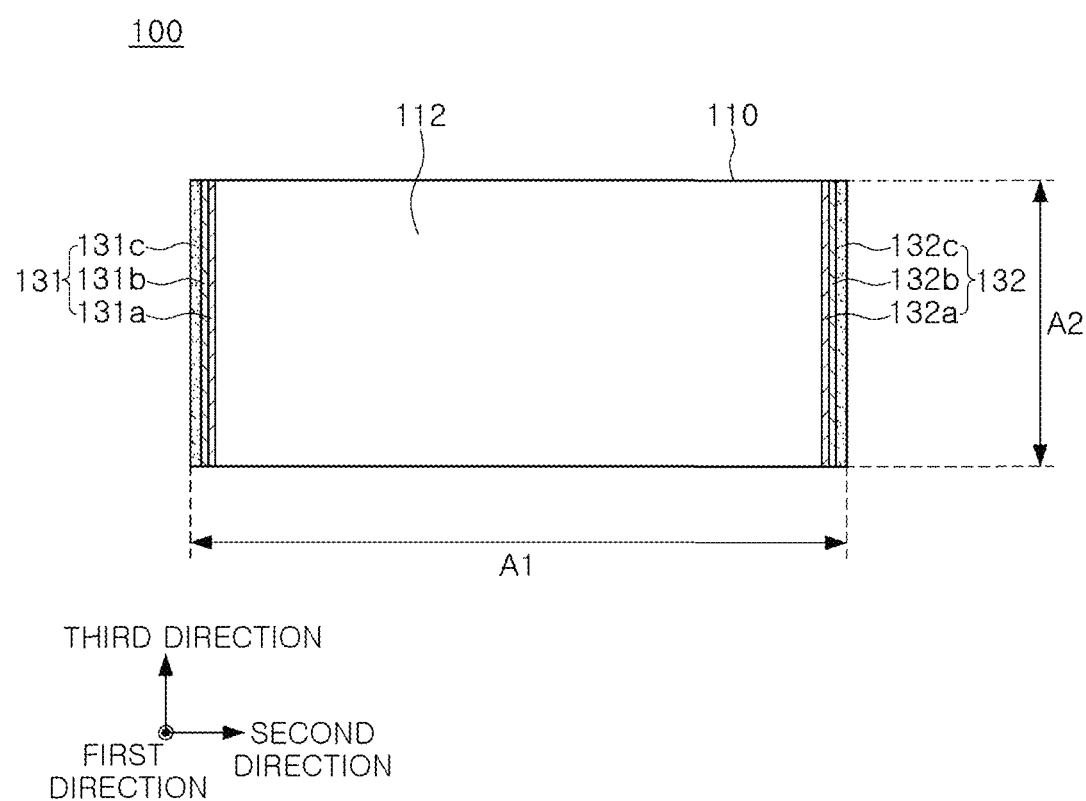
FIG. 4 is a plan view of a multilayer ceramic capacitor according to an embodiment of the present disclosure.

FIG. 4 is a plan view of a multilayer ceramic capacitor 100 according to an embodiment of the present disclosure.

Referring to FIG. 4, when viewed in a stacking direction of the a first internal electrode 121 and a second internal electrode 122, a length A1 of one side thereof may have a value corresponding to between −10% and +10% of (250+n*350)μm, and a length A2 of the other side thereof may have a value corresponding to between −10% and +10% of (250+m*350)μm, where n and m may be natural numbers.

For example, when n and m are 1, the multilayer capacitor 100 has a size of 600 μm*600 μm. However, considering an error range, a length of one side thereof (A1) may have a value corresponding to between 10% and +10% of (250+n*350)μm, and a length of the other side thereof (A2) may have a value corresponding to between −10% and +10% of (250+m*350)μm.

Here, the lengths A1 and A2 of one side and the other side thereof is made to be increased by a multiple of 350 μm in consideration of a pitch value of the solder ball, or the like, during mounting. Meanwhile, the lengths A1 and A2 of the multilayer ceramic capacitor 100 may mean a maximum value among values measured in a plurality of regions, or alternatively, may be a value obtained by averaging a plurality of values.

The thicknesses and lengths disclosed herein may be measured by, for example, an optical microscope or a scanning electron microscope (SEM).

Figure 5:
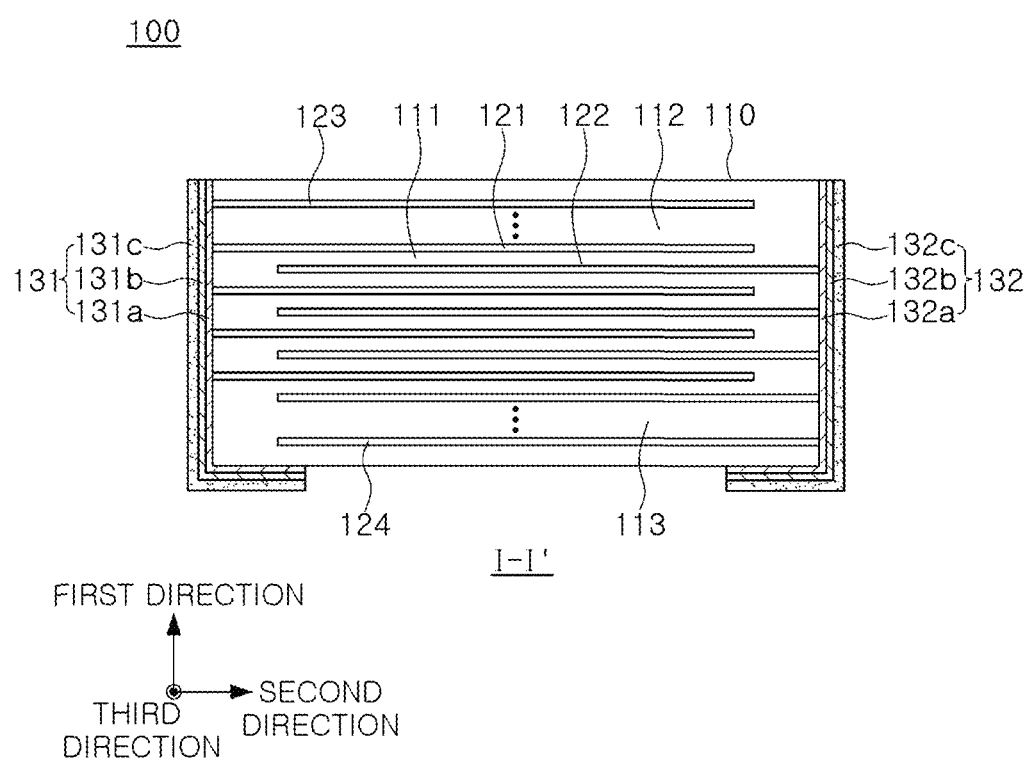
FIG. 5 is a cross-sectional view of a multilayer ceramic capacitor according to an embodiment of the present disclosure.

FIG. 5 is a cross-sectional view of a multilayer ceramic capacitor 100 according to an embodiment of the present disclosure.

Referring to FIG. 5, the body 110 may include a capacitance formation portion including a plurality of a first internal electrode 121 and a second internal electrode 122 and cover portions disposed in upper and lower portions of the capacitance formation portion, and may include a plurality of dummy electrodes 123 and 124 disposed in the cover portion.

The dummy electrodes 123 and 124 may be formed by printing a paste including a conductive metal. The conductive metal may be made of Ni, Cu, Pd, Ag and Pt and alloys thereof, but the present disclosure is not limited thereto. Also, in consideration of process efficiency, the same paste as a paste for forming a plurality of internal electrodes 121 and 122 may be printed.

The first dummy electrode 123 disposed in an upper cover portion 112 may be formed of electrodes stacked in the same direction as the first internal electrode 121, and may be equally exposed to a side surface of the body 110 to which the first internal electrode 121 is exposed to be connected to a first electrode layer 131a of the first external electrode 131.

The second dummy electrode 124 disposed in a lower cover portion 113 may be formed of electrodes stacked in the same direction as the second internal electrode 122 disposed in a capacitance formation portion, and may face a side surface of the body 110 to which the first internal electrode 121 is exposed, and may be equally exposed to the other surface of the body 110 to which the second internal electrode 122 is exposed, to be connected to a first electrode layer 132a of the second external electrode 132.

The multilayer ceramic capacitor 100 having a thickness of 70 μm or less has high brittleness and low mechanical strength, thereby increasing the possibility of breakage during a measurement, selection, and taping process of the multilayer ceramic capacitor during damage and a mounting process.

On the other hand, when the dummy electrodes 123 and 124 are disposed in the upper and lower cover portions 112 and 113 according to an embodiment of the present disclosure, rigidity of the multilayer ceramic capacitor 100 may be increased, and a metal ratio inside the body 110 may be increased to increase mechanical strength, thereby reducing a frequency of occurrence of cracks. Accordingly, the low mechanical strength of the multilayer ceramic capacitor 100 having a thickness of 70 μm or less may be improved.

The number of stacked dummy electrodes 123 and 124 disposed in the upper and lower cover portions 112 and 113 may be one or more layers in order to improve the mechanical strength of the multilayer ceramic capacitor 100, respectively. For example, one layer of dummy electrodes 123 may be disposed in the upper cover portion 112, and one layer of dummy electrodes 124 may be disposed in the lower cover portion 113.

An upper limit value of the number of stacks of the dummy electrodes 123 and 1213 may be different depending on the thickness of the multilayer ceramic capacitor 100, the thickness of the cover portions 112 and 113, the thickness of the dummy electrodes 123 and 124, and the like, but, in order not to excessively increase the thickness of the multilayer ceramic capacitor 100, each layer may be 5 or less. However, the present disclosure is not limited thereto.

Meanwhile, although FIG. 5 illustrates that the dummy electrodes 123 and 124 are disposed in both the upper and lower cover portions 112 and 113, a dummy electrode 123 may be disposed only in the upper cover portion 112, or a dummy electrode 124 may be disposed only in the lower cover portion 113.

According to an embodiment of the present disclosure, the first external electrode 131 and the second external electrode 132 may cover a side surface of the body 110, and may extend only to a first surface of the first surface S1 and the second surface S2 opposite to each other based on a stacking direction of a first internal electrode 121 and a second internal electrode 122 within the body 110.

That is, the first external electrode 131 may cover a side surface to which the first internal electrode 121 is exposed, to be electrically connected to the first internal electrode 121, and may cover a side surface to which the second internal electrode 122 is exposed, to be electrically connected to the second internal electrode 122.

Since the external electrodes 131 and 132 extend only to the first surface S1, in the multilayer ceramic capacitor 100 having a thickness of 70 μm or less, a volume occupied by the body 110 may be improved, thereby maximizing the capacitance.

Figure 6:
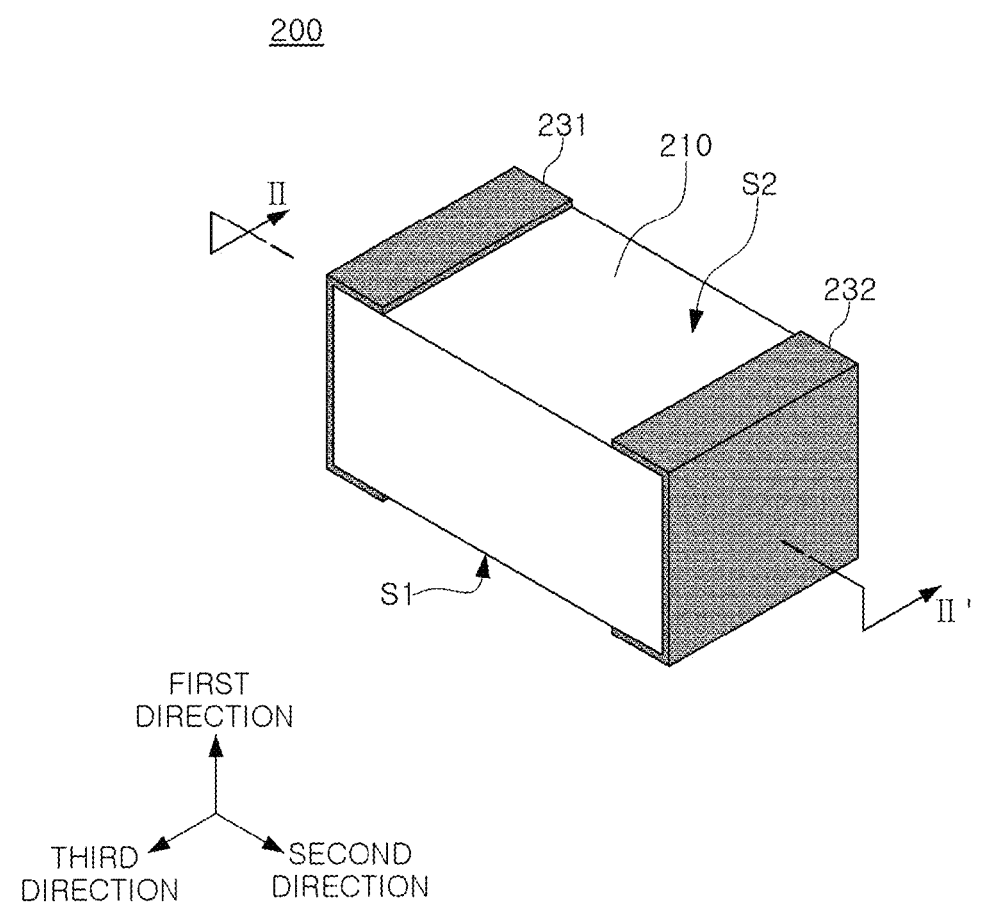
FIG. 6 is a perspective view schematically illustrating a multilayer ceramic capacitor according to an embodiment of the present disclosure.
Figure 7:
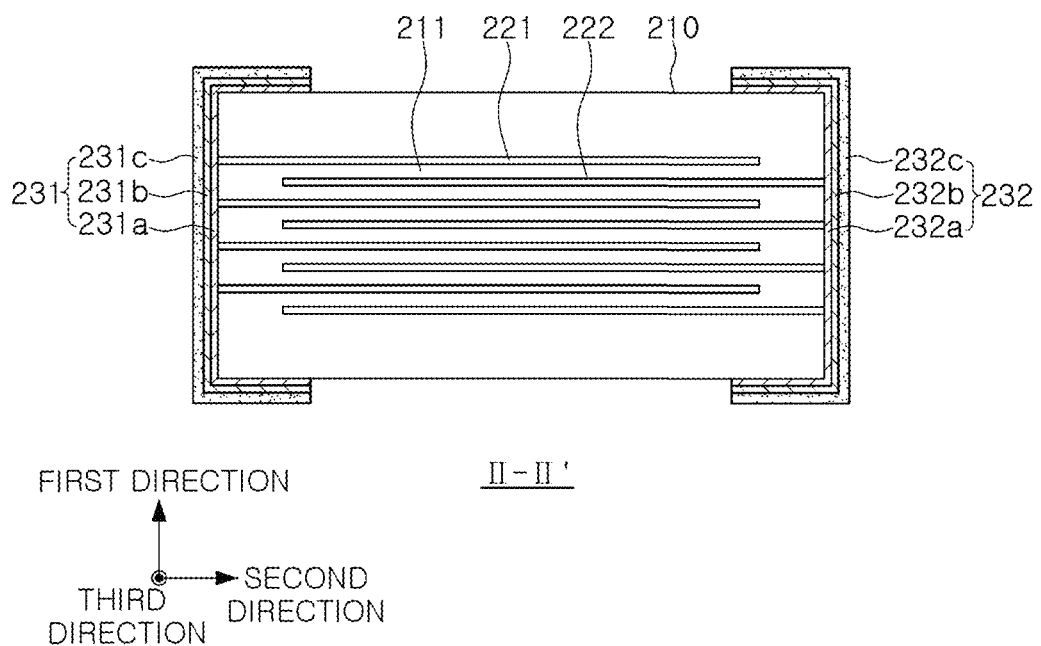
FIG. 7 is a cross-sectional view taken along line II-II' of FIG. 6.

Meanwhile, referring to FIGS. 6 and 7, the first and second external electrodes 231 and 232 may extend to the first and second surfaces S1 and S2.

As the external electrodes 231 and 232 extend to the first and second surfaces, adhesion to the body 210 may be improved, and moisture resistance reliability may be improved.

Since the external electrodes 231 and 232 include first electrode layers 231*a* and 232*a* and second electrode layers 231*b* and 232*b*, which are sputtering layers, and plating layers 231*c* and 232*c* formed on the second electrode layers 231*b* and 232*b*, the external electrodes 231 and 232 may be thinned to form a thin layer. Accordingly, in the ultra-thin multilayer ceramic capacitor 200 having a thickness of 70 μm or less, the volume occupied by the body 210 may be increased to maximize capacitance.

Figure 8:
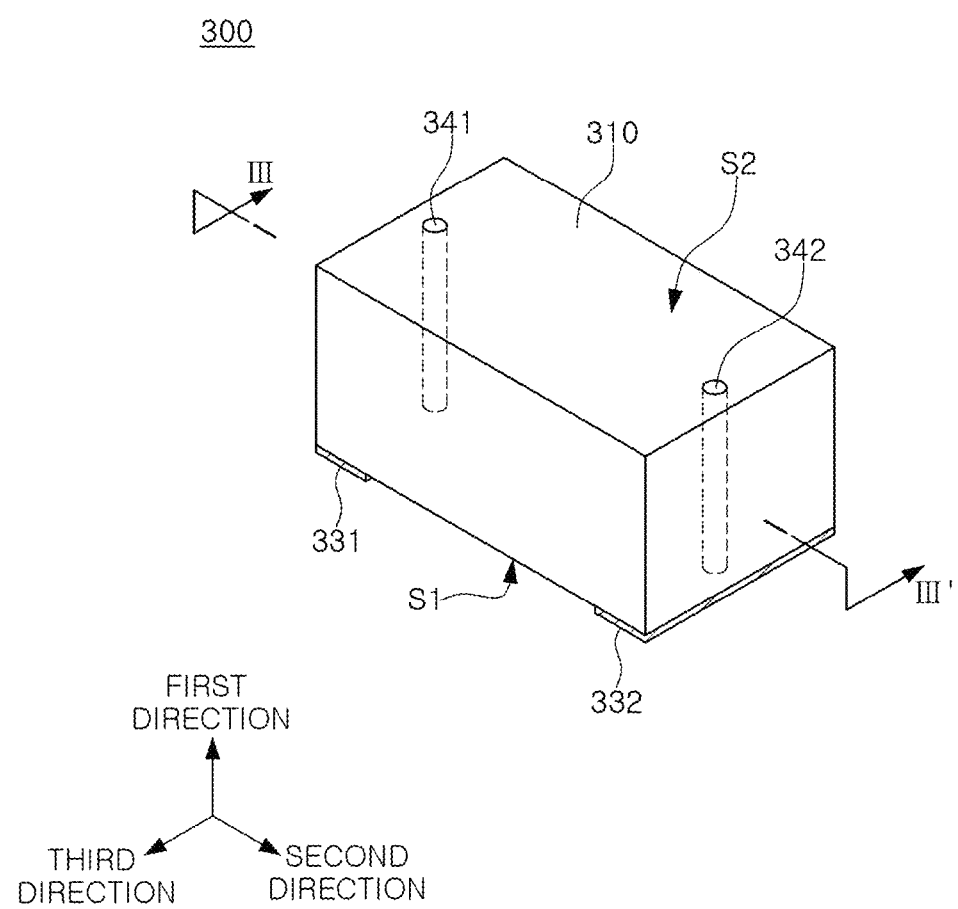
FIG. 8 is a perspective view schematically illustrating a multilayer ceramic capacitor according to another embodiment of the present disclosure.
Figure 9:
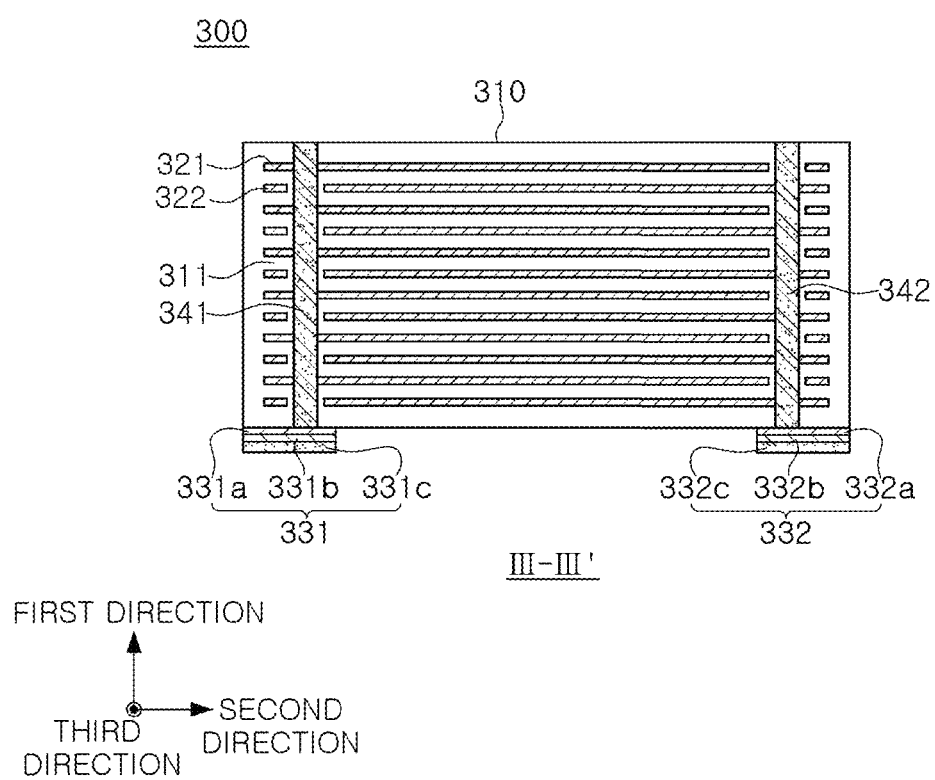
FIG. 9 is a cross-sectional view taken along line III-III' of FIG. 8.

FIG. 8 is a perspective view schematically illustrating a multilayer ceramic capacitor according to another embodiment of the present disclosure, and FIG. 9 is a cross-sectional view taken along line III-III' of FIG. 8.

Referring to FIGS. 8 and 9, first and second external electrodes 331 and 332 may be disposed only on a first surface S1 of a first surface S1 a second surface S2 facing each other based on a stacking direction of a first internal electrode 321 and a second internal electrode 322 from a body 310, the first external electrode 331 may be connected by a first connection electrode 341 penetratingly disposed within the body, and the second external electrode 332 may be connected by a second connection electrode 342 penetratingly disposed within the body.

That is, the first external electrode 331 may be disposed on the first surface S1 of the body 310, and may be connected by the first connection electrode 341 penetratingly disposed within the body 310, and the second external electrode 332 may be disposed on the first surface S1 of the body 310, and may be connected by the second connection electrode 342 penetratingly disposed within the body 310. In addition, the first external electrode 331 and the second external electrode 332 may be disposed to be spaced apart from each other.

The first connection electrode 341 may be connected to the first internal electrode 321 and insulated from the second internal electrode 322, and the second connection electrode 342 may be connected to the second internal electrode 322 and insulated from the first internal electrode 321.

Accordingly, since the first external electrode 331 is connected by the first connection electrode 341, and the first connection electrode 341 is connected to the first internal electrode 321 and is insulated from the second internal electrode 322, the first external electrode 331 may be electrically connected to the first internal electrode 321.

In addition, since the second external electrode 332 is connected by a second connection electrode 342, and the second connection electrode 342 is connected to the second internal electrode 322 and is insulated from the first internal electrode 321, the second external electrode 332 may be electrically connected to the second internal electrode 322.

Meanwhile, the a first internal electrode 321 and a second internal electrode 322 may not be exposed to one surface of the body 310 and the other surface opposite to the one surface of the body, and accordingly, may respectively be connected to the first external electrode 331 and the second external electrode 322 disposed on the first surface S1 of the body 310 through the first connection electrode 341 and the second connection electrode 342.

The first connection electrode 341 and the second connection electrode 342 may be formed by forming a hole in the body 310 and the first internal electrode and the second internal electrode 321 and 322 and filling the hole with a conductive material. The conductive material may be formed by applying a conductive paste or using a method such as plating, or the like. In this case, the hole of the ceramic body 310 may be formed in a ceramic green sheet by a laser method, punching, or the like, or may be obtained by processing a hole in a laminate after sintering.

Referring to FIGS. 8 and 9, the first connection electrode 341 and the second connection electrode 342 are exposed through the second surface S2 of the body 310, but the present disclosure is not limited thereto, and end portion of the first connection electrode 341 and the second connection electrode 342 may be covered by an upper cover region in which the first internal electrode 321 and the second internal electrode 322 are not disposed.

The first and second internal electrodes 321 and 322 may respectively be connected to the first external electrode 331 and the second external electrode 332 by the first connection electrode 341 and the second connection electrode 342, thereby interposing the dielectric layer 311 therebetween to maximize an area in which the first and second internal electrodes 321 and 322 overlap each other. Accordingly, the capacitance of an ultra-thin multilayer ceramic capacitor 300 having a thickness of 70 μm or less may be maximized.

As set forth above, according to one of the various effects of the present disclosure, capacitance of a thin multilayer ceramic capacitor may be improved, and a multilayer ceramic capacitor having improved conductivity of an external electrode and improved adhesion to a body may be provided.

However, various and advantageous advantages and effects of the present invention are not limited to the above description, and will be more readily understood in the process of describing specific embodiments of the present invention.

While the embodiments have been illustrated and described above, it will be apparent to those skilled in the art that modifications and variations could be made without departing from the scope in the embodiment as defined by the appended claims.

What is claimed is:

1. A multilayer ceramic capacitor, comprising:
   a body including a dielectric layer and first and second internal electrodes alternately disposed with the dielectric layer interposed therebetween; and
   a first external electrode and a second external electrode disposed externally on the body, the first external electrode being connected to the first internal electrode and the second external electrode being connected to the second internal electrode,
   wherein the first and second external electrodes include a first electrode layer disposed on a side surface of the body directly contacting the first and second internal electrodes respectively, and including Ni and Cr, a second electrode layer disposed on the first electrode layer, and including Cu, and a plating layer disposed on the second electrode layer, wherein an average thickness of the second electrode layer is 10 to 300 nm.

2. The multilayer ceramic capacitor of claim 1, wherein a content of Cr in the first electrode layer is 30 to 50 wt %.

3. The multilayer ceramic capacitor of claim 1, wherein the first and second electrode layers are sputtering layers.

4. The multilayer ceramic capacitor of claim 1, wherein an average thickness of the first electrode layer is 10 to 100 nm.

5. The multilayer ceramic capacitor of claim 1, wherein the plating layer comprises a first plating layer disposed on the second electrode layer, and including Ni, and a second plating layer disposed on the first plating layer, and including Sn.

6. The multilayer ceramic capacitor of claim 5, wherein an average thickness of the first and second plating layers is 1 to 5 μm.

7. The multilayer ceramic capacitor of claim 1, wherein the multilayer ceramic capacitor has a thickness of 70 μm or less.

8. The multilayer ceramic capacitor of claim 1, wherein, when viewed in a stacking direction of the first and second internal electrodes, one side thereof has a length corresponding to between −10% and +10% of (250+n*350) μm, and the other side thereof has a length corresponding to between −10% and +10% of (250+m*350) μm, where n and m are natural numbers.

9. The multilayer ceramic capacitor of claim 1, wherein the body comprises a capacitance formation portion including a plurality of the first and second internal electrodes and a cover portion disposed in upper and lower portions of the capacitance formation portion, and a plurality of dummy electrodes disposed in the cover portion.

10. The multilayer ceramic capacitor of claim 1, wherein the first and second external electrodes cover a side surface of the body, and extend from the body to at least one of a first surface of the body and a second surface of the body facing the first surface, based on a stacking direction of the first and second internal electrodes.

11. The multilayer ceramic capacitor of claim 10, wherein the first and second external electrodes extend to the first and second surfaces of the body.

12. The multilayer ceramic capacitor of claim 10, wherein the first and second external electrodes extend to only one of the first surface of the body and the second surface of the body.

13. A multilayer ceramic capacitor, comprising:
a body including a dielectric layer and first and second internal electrodes alternately disposed with the dielectric layer interposed therebetween; and
a first external electrode and a second external electrode disposed externally on the body, the first external electrode being connected to the first internal electrode and the second external electrode being connected to the second internal electrode, wherein the first and second external electrodes are disposed only on one of first and second surfaces of the body facing each other with respect to a stacking direction of the first and second internal electrodes, and wherein the first and second external electrodes include a first electrode layer disposed on the body, the first electrode layer including Ni and Cr, and a content of Cr in the first electrode layer is 30 to 50 wt %, a second electrode layer disposed on the first electrode layer, and including Cu, and a plating layer disposed on the second electrode layer.

14. The multilayer ceramic capacitor of claim 13, wherein the first and second electrode layers are sputtering electrodes.

15. The multilayer ceramic capacitor of claim 14, wherein a thickness of the first electrode layer is 10 to 100 nm.

16. The multilayer ceramic capacitor of claim 15, wherein the plating layer comprises a first plating layer disposed on the second electrode layer, and including Ni, and a second plating layer disposed on the first plating layer, and including Sn.

17. A multilayer ceramic capacitor, comprising:
a body including a dielectric layer and first and second internal electrodes alternately disposed with the dielectric layer interposed therebetween; and
a first external electrode and a second external electrode disposed externally on the body, the first external electrode being connected to the first internal electrode and the second external electrode being connected to the second internal electrode, wherein the first and second external electrodes include a first electrode layer disposed on a side surface of the body directly contacting the first and second internal electrodes respectively, and including Ni and Cr, a second electrode layer disposed on the first electrode layer, and including Cu, and a plating layer disposed on the second electrode layer, wherein the first and second external electrodes cover a side surface of the body, and extend from the body to only one of a first surface of the body and a second surface of the body facing the first surface, based on a stacking direction of the first and second internal electrodes.

18. The multilayer ceramic capacitor of claim 17, wherein, when viewed in the stacking direction, one side thereof has a length corresponding to between −10% and +10% of (250+n*350) μm, and the other side thereof has a length corresponding to between −10% and +10% of (250+m*350) Um, where n and m are natural numbers.

19. The multilayer ceramic capacitor of claim 17, wherein the body comprises a capacitance formation portion including a plurality of the first and second internal electrodes and a cover portion disposed in upper and lower portions of the capacitance formation portion, and a plurality of dummy electrodes disposed in the cover portion.

20. The multilayer ceramic capacitor of claim 17, wherein a content of Cr in the first electrode layer is 30 to 50 wt %.

* * * * *